Nov. 22, 1932.   H. J. TITUS   1,888,778
CONTROLLING MECHANISM FOR LOCOMOTIVE BOOSTERS
Filed Feb. 18, 1931   3 Sheets-Sheet 3

INVENTOR
Hubert J. Titus
BY
ATTORNEYS

Patented Nov. 22, 1932

1,888,778

UNITED STATES PATENT OFFICE

HUBERT J. TITUS, OF PATERSON, NEW JERSEY, ASSIGNOR TO FRANKLIN RAILWAY SUPPLY COMPANY, OF NEW YORK, N. Y., A CORPORATION OF DELAWARE

CONTROLLING MECHANISM FOR LOCOMOTIVE BOOSTERS

Application filed February 18, 1931. Serial No. 516,563.

The present invention relates to a controlling system for a locomotive booster motor and is particularly concerned with that type of locomotive booster equipment in which the steam for operating the booster is supplied to the booster through a pipe which is connected to the steam supply means for the cylinders of the locomotive. In arrangements of this kind it is, of course, clear that the supply of steam for the booster motor is subject to the control of the main locomotive throttle. In instances, therefore, where the main locomotive throttle is closed, as, for example, when the main drivers slip, the supply of operating steam to the booster will be cut off.

Under such circumstances, the reciprocation of the pistons in the cylinders of the locomotive, while the locomotive is drifting with the throttle valve closed, will create a suction in the steam pipe leading to the booster motor. The suction so created is sufficiently great to draw from the booster the comparatively small quantity of steam ordinarily supplied through the preliminary throttle valve. It should here be noted that the steam supplied to the locomotive booster through the preliminary throttle valve, is used for the purpose of idling the booster in order to clear it of condensation, as well as to insure proper meshing of the gears during entrainment.

With all of the foregoing in mind, the objects of my invention will be better understood, and they may be said to include the provision of means for preventing withdrawal of the supplementary steam supply at times when the locomotive is drifting with its throttle shut off; the provision of means for closing the booster throttle when the pressure of steam in the booster supply line falls below a predetermined point; and the provision of a suitable pilot means for automatically effecting the objects just enumerated.

I also wish to call attention to the fact that it is often desired to keep the booster in operation at times when it is necessary to drift the engine over turn-outs or up to a signal. With arrangements previously in use, this was not possible where the booster received its supply of steam from the steam pipe leading to the locomotive cylinders, when the locomotive throttle was closed because, just as soon as the locomotive throttle was closed, the booster would be thrown out of operation. However, with the improvements herein set forth, it is possible to keep the booster gears in mesh or the booster entrained and to maintain the supply of supplementary or preliminary steam customary in this art, even at times when the main locomotive throttle is closed.

The foregoing, together with such other objects as may appear hereinafter or are incident to my invention, are obtained by means of the equipment which is illustrated in a preferred form in the accompanying drawings, wherein Fig. 1 is a diagram of a booster controlling mechanism embodying my improvements;

Figure 1:
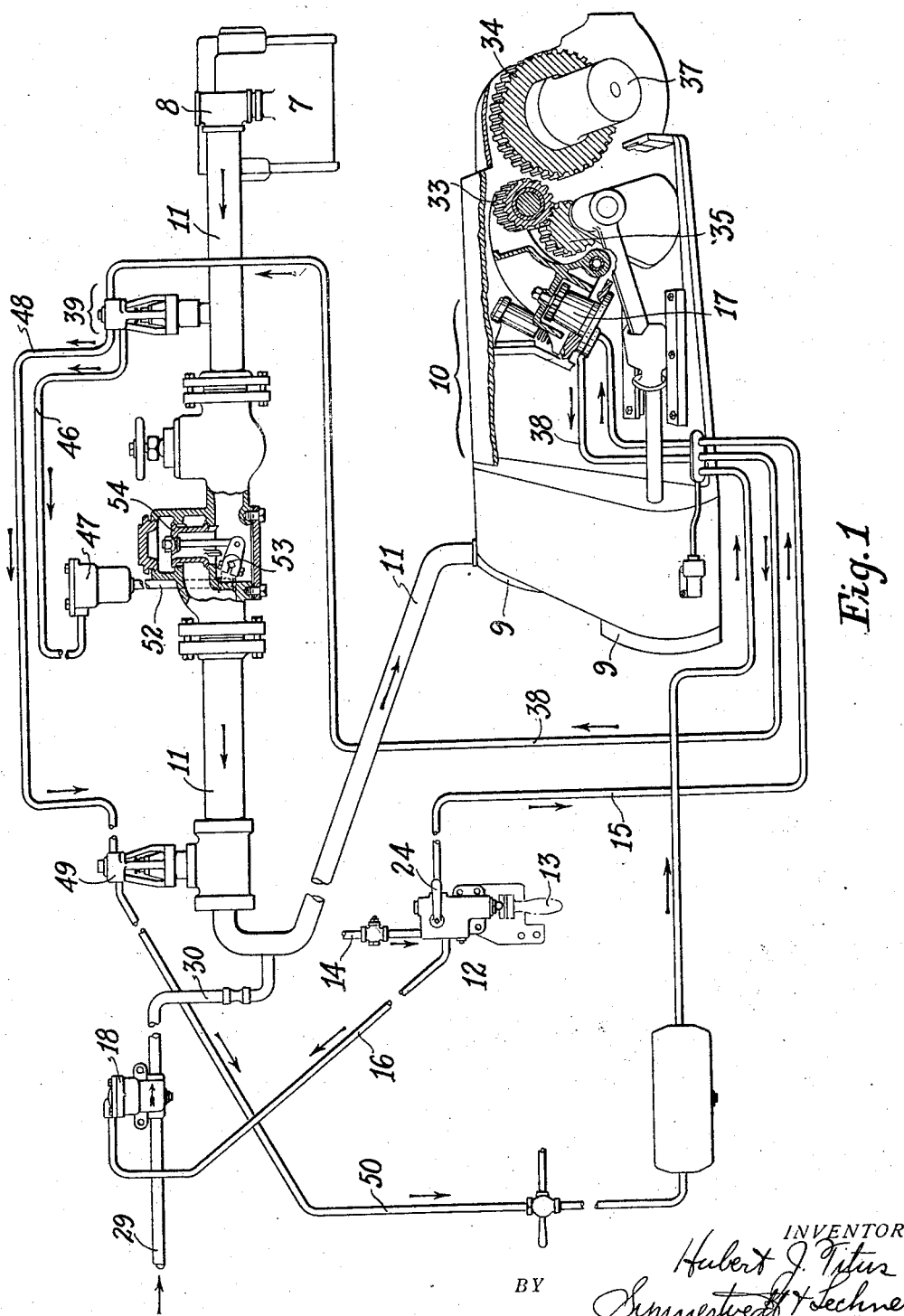
Figure 2:
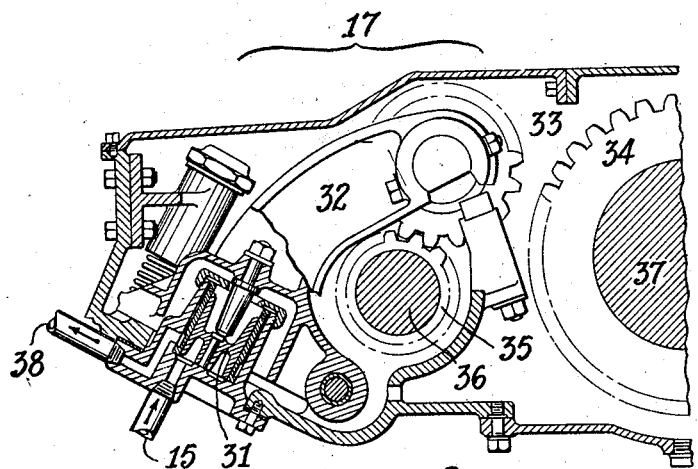
Fig. 2 is an enlarged view of the entraining mechanism with the entraining motor illustrated in section.

Referring to the drawings and particularly in the first instance, to Fig. 1, it will be seen that I have shown one of the locomotive cylinders 7, which is supplied with steam in the usual way through steam pipe 8, which is under the control of the locomotive throttle, not shown.

The cylinders 9 of the booster motor 10 are supplied with steam through the supply line or pipe 11, which is connected, as shown, to the supply means 8 for the locomotive cylinders 7, the flow of steam taking place in the direction indicated by the arrows in the pipe 11.

When it is desired to place the booster in operation, the reverse lever pilot valve 12 is actuated by means of the latch 13 to permit air pressure coming in from the reservoir through the pipe 14 to reach the pipes 15 and 16, the former of which goes to the entraining motor 17 and the latter of which to the preliminary throttle valve 18, direction of the flow of the air being indicated by the arrows.

Figure 4:
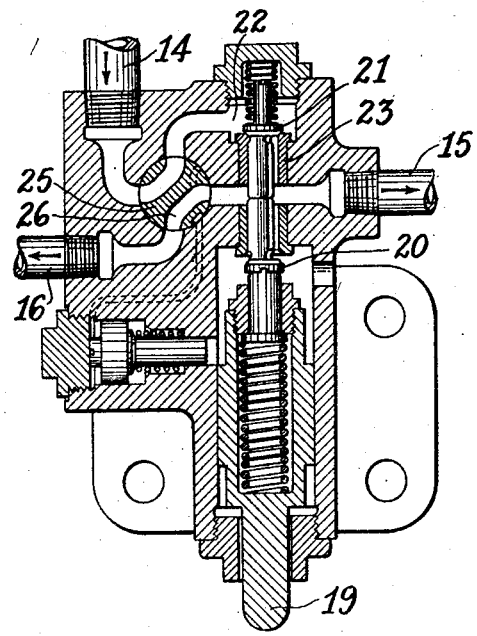
Fig. 4 is an enlarged detail view illustrating the principal features of construction in what is known as the reverse lever pilot valve for a booster controlling system of the character herein disclosed.

This operation is now well-known in this art but reference may be had to Fig. 4 for a detail showing of the manner in which the air travels from the pipe 14 to the pipes 15 and 16. The latch 13 presses against the plunger 19 and closes the valve 20 while opening the valve 21, so that the air coming in through the pipe 14 can pass from the chamber 22 into the chamber 23 and from thence into the pipes 15 and 16, as clearly shown in Fig. 4.

Figure 5:
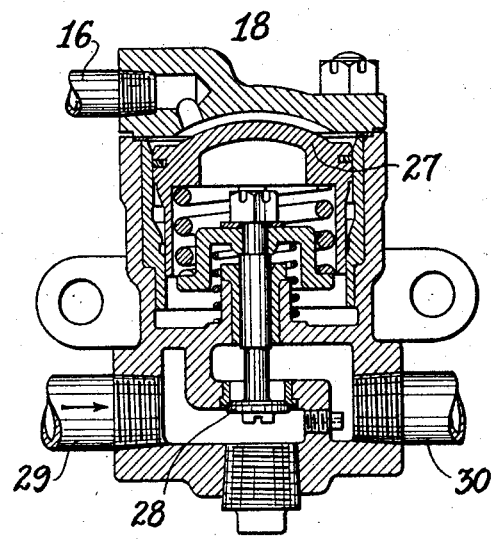
Fig. 5 is an enlarged section through the preliminary throttle valve mechanism and, Fig. 6 is an enlarged section through the fluid actuated motor device for operating the booster throttle valve.

When it is desired to idle the booster motor, the handle 24 may be turned so as to rotate the plug valve 25 to a position where it will directly connect the pipe 14 with the pipe 16 through the channel 26. This will permit air to reach the preliminary throttle valve 18, shown in detail in Fig. 5. When the pressure reaches the piston 27 in the preliminary throttle valve, it will force the said piston downwardly in order to open the valve 28 and thereby permit steam to flow from the pipe 29 to the pipe 30, which leads to the steam supply pipe 11 going to the booster, the direction of flow again being indicated by the arrows.

When the air pressure reaches the entraining motor 17, it raises the piston 31 and rocks the member 32 to the right in order to mesh the idler gear 33 with the axle gear 34, the idler gear being at all times in mesh with the booster driving pinion 35 mounted upon the booster crank shaft 36. The axle gear 34 is, of course, fixed to the axle 37, which axle is the one to be driven by the locomotive booster.

After entrainment has taken place, the air passes out from the entraining motor 17 through the pipe 38, which delivers to the pilot mechanism indicated as a whole by the reference character 39. Here the air is blocked by means of the valve 40, which is seen to best advantage in Fig. 3. The lower portion of the pilot mechanism is connected to the booster steam pipe 11 so that the piston 41 is subject to the control of the pressure of steam in the pipe 11, the steam entering the pilot device through the passage 42.

Whenever the pressure in the steam pipe 11 is above a predetermined point which, of course, can be regulated as desired by varying the tension of the springs 43 and 44, the piston 41 will be moved upwardly so as to close valve 45 and open valve 40. In this way air will travel from pipe 38 over to pipe 46, which leads to the booster throttle operating motor or cylinder 47 shown in detail in Fig. 6.

Figure 3:
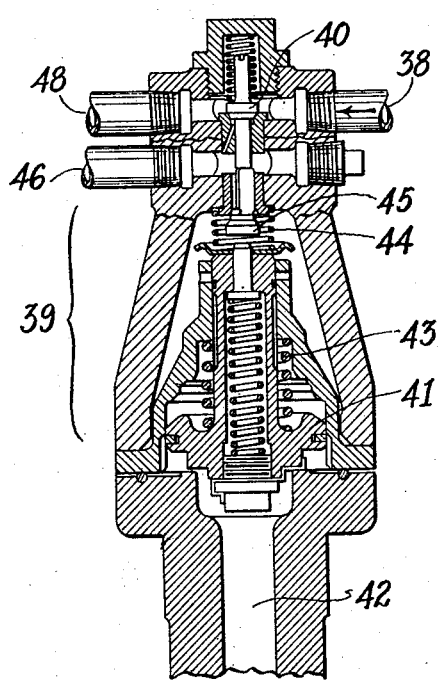
Fig. 3 is an enlarged view, partly in section, illustrating the pilot mechanism used with my invention.

As will be seen upon inspection of Fig. 3, the air coming in through pipe 38 is also free to pass out through pipe 48 to a similar pilot device 49 which controls the air going through pipe 50, the latter being connected to the cylinder cock-controlling mechanism used in this art but not illustrated in detail in the present case because it forms no part of the present invention and need not be described in order to fully appreciate and understand the invention claimed herein.

Figure 6:
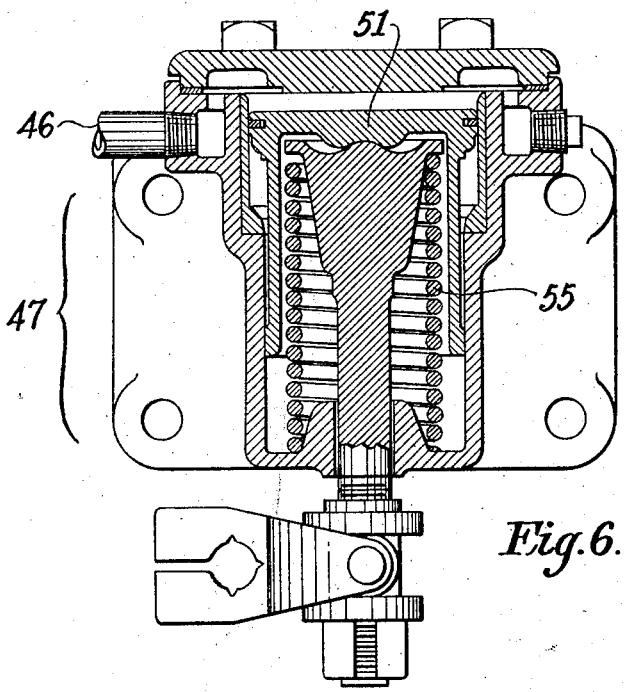

By referring to Fig. 6, it will be seen that the air coming in through the pipe 46 will depress the piston 51, which is connected by means of the rod 52 (shown in Fig. 1) to a suitable lever mechanism 53 for raising and opening the booster throttle valve 54. When pressure is exhausted above the piston 51 the spring 55 will, of course, return the piston 51 to its upper position and close the booster throttle valve 54.

The operation of the controlling system may be summarized as follows:

If, for any reason, the locomotive throttle is closed such, for example, as will occur when the engineer pulls back his throttle lever in order to stop slipping of the main drivers, or when he desires to drift over a turn-out or up to a signal, there will, of course, be no steam going through the pipe 8 to the cylinder 7 and the booster supply pipe 11. Should this condition continue for any length of time, the booster steam pipe 11 would soon be drained of all of its steam and the suction created by the pistons in the cylinder 7 would be sufficient to pull or draw any supplemental steam coming in through the preliminary pipe 30 out of the booster line 11 so that practically no steam would reach the booster.

However, by my invention the pilot means 39 will now operate to close the valve 40 and thereby shut off the supply of operating fluid to the booster throttle operating motor 47. The booster throttle 54 will immediately close and the steam pipe 11 will not be drained of any steam coming in through the pipe 30.

What I claim is:—

1. Locomotive booster motor apparatus including in combination with a cylinder of the locomotive and its steam supply means, a steam actuated booster motor, an axle to be driven thereby, entraining mechanism for connecting the booster motor to said axle including a fluid actuated entraining motor, a steam supply pipe connecting the booster motor with said locomotive steam supply means, a throttle valve in said supply pipe, a supplemental means for supplying the booster motor with steam, a fluid pressure actuated motor device for opening said throttle valve, a line for supplying fluid pressure to said entraining motor, a line adapted to supply fluid pressure from the entraining motor to the throttle opening motor after entrainment has been effected, a valve in said last line, and means actuated by pressure of steam in the pipe which connects the booster motor with the locomotive supply means for opening the valve in said last line, said valve opening means acting to close the valve upon substantial cessation of pressure in the steam supply means for the locomotive cylinder whereby to cut off the supply of fluid to the throttle operating motor without disturbing the supply to the entraining motor.

2. Locomotive booster motor apparatus in which the booster motor is normally disentrained and inoperative, characterized by the fact that a fluid actuated motor mechanism is provided for effecting entrainment and further by the fact that the booster is supplied with operating steam through a line which is connected to the supply means for the locomotive cylinders and is also supplied with preliminary steam from an independent source and, still further, by the fact that fluid actuated means are provided for controlling the line which supplies the booster with its operating steam, which means receives its fluid pressure from the entraining mechanism after entrainment has been completed and, finally, by the fact that means are provided for closing the line which supplies the booster with steam by cutting off the supply of fluid to its fluid actuated controlling means upon substantial cessation of pressure in the supply means for the locomotive cylinders but without causing disentrainment of the booster.

3. Locomotive booster motor apparatus including in combination with a steam actuated booster motor, a primary steam supply line therefor, an axle to be driven by the booster, entraining mechanism for connecting the booster motor to said axle including a fluid actuated entraining motor, a thottle valve in said primary booster steam supply line, a supplemental means for supplying the booster motor with steam independent of the control exercised by said throttle valve, a fluid pressure actuated motor device for opening the throttle, a line for supplying fluid pressure to said entraining motor, a line adapted to supply fluid pressure from the entraining motor to the throttle opening motor after entrainment has been effected, a valve in said last line, and means actuated by pressure of steam in the primary booster motor steam supply line for opening the valve in the line which supplies fluid pressure from the entraining motor to the throttle opening motor, said valve opening means acting to close the valve upon substantial cessation of pressure in the primary steam supply line whereby to cut off the supply of fluid to the throttle operating motor without disturbing the supply to the entraining motor.

4. In locomotive booster motor apparatus, the combination of a normally disentrained booster motor, fluid actuated mechanism for effecting entrainment thereof, a steam supply line for the booster, a throttle valve in said line, fluid pressure actuated means for opening said throttle, a line for supplying fluid pressure to said entraining mechanism, a line adapted to supply fluid pressure from the entraining mechanism to the throttle actuating means after entrainment has been effected, a valve in said last line, and means actuated by pressure of steam in the supply line for opening said valve, said valve opening means acting to close the valve upon substantial cessation of pressure in the steam supply line whereby to cut off the supply of fluid to the throttle actuating means without disturbing the supply to the entraining motor.

5. In locomotive booster apparatus, the combination of a booster motor, mechanism for entraining it to aid in driving the locomotive, a normally closed primary steam supply line for the booster, means for opening said line after entrainment has been effected, supplemental means for supplying the booster motor with steam independently of the supply through the primary supply line, and means acting independently of the entrainment mechanism for effecting closure of the primary line upon substantial cessation of pressure therein.

In testimony whereof I have hereunto signed my name.

HUBERT J. TITUS.